(12) United States Patent
Jang

(10) Patent No.: US 6,305,771 B1
(45) Date of Patent: Oct. 23, 2001

(54) MULTI-FUNCTIONAL APPARATUS

(75) Inventor: Heung-Kyu Jang, Kyonggi-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/219,875

(22) Filed: Dec. 24, 1998

(30) Foreign Application Priority Data

Dec. 26, 1997 (KR) .................................................. 97-74272

(51) Int. Cl.⁷ .............................. H04N 1/034; B41J 2/165
(52) U.S. Cl. .................................. 347/3; 347/22; 347/33
(58) Field of Search .................................. 347/3, 22, 33; 358/472, 474, 497

(56) References Cited

U.S. PATENT DOCUMENTS

| | | | |
|---|---|---|---|
| 4,345,262 | * 8/1982 | Shirato et al. | 347/10 |
| 5,350,929 | * 9/1994 | Meyer et al. | 250/573 |
| 5,717,505 | 2/1998 | Change et al. | 358/490 |
| 5,812,172 | * 9/1998 | Yamada | 347/171 |

* cited by examiner

Primary Examiner—John Barlow
Assistant Examiner—Craig A. Hallacher
(74) Attorney, Agent, or Firm—Robert E. Bushnell, Esq.

(57) ABSTRACT

In a multi-functional apparatus, a carriage having a printhead and a scanner mounted thereon is reciprocally and slidably moved along a guide shaft by a driving motor as a driving source, a transparent window is provided adjacent to an opening formed in a lower portion of the scanner, a recess for disposing a dusting implement is formed at a side of a document support which is disposed below the scanner and supports a document to be scanned, and an electronic controller controls the driving motor so that the window of the scanner is disposed over the recess for disposing the dusting implement therein when a cleaning mode is selected.

13 Claims, 9 Drawing Sheets

MULTI-FUNCTIONAL APPARATUS

CLAIM OF PRIORITY

This application makes reference to, incorporates the same herein, and claims all benefits accruing under 35 U.S.C. §119 from my application for A MULTI-FUNCTIONAL APPARATUS earlier filed in the Korean Industrial Property Office on the of Dec. 26, 1997 and there duly assigned Serial No. 74272/1997.

BACKGROUND OF THE INVENTION

1. Field of the Invention

The present invention relates to a multi-functional apparatus, and more particularly to a multi-functional apparatus in which cleaning of a scanner is performed without disassembling the scanner therefrom.

2. Description of the Prior Art

Generally, a printer is an apparatus for printing data, characters, or graphics made by using a computer on a recordable paper, and a copier is an apparatus for copying a document or data in graphic form on a certain quantity of paper. On the other hand, a facsimile device is an apparatus for transferring data to a person who is in a remote place.

Office automation apparatus as described above have their respective functions. It is difficult to place all of the office automation apparatus in an office.

To overcome the difficulty as described above, the scanner, the copier, and the facsimile device are integrated into a multi-functional apparatus.

Hereinafter, an operation of the multi-functional apparatus 1 including a shuttle type scanner will be described with reference to FIGS. 1 to 3.

A feeder 10 for feeding recordable papers is mounted at an upmost portion of the multi-functional apparatus, which has a mode 11 for feeding a sheet of the recordable paper or a document and a mode 12 for feeding the recordable papers or the document continuously. A user can select the feeding mode according to the user's convenience.

When the recordable papers or document are introduced into the feeder 10 as the user selects the feeding mode, a feed roller 21 and a friction roller 22 feed the recordable paper to be printed or the document to be scanned under a predetermined pressure.

A carriage 30 having a printhead 31 for printing data on the recordable paper and a scanner 32 for scanning the document mounted thereon are moved as the feed roller 21 and the friction roller 22 feed the recordable paper or the document.

With respect to the carriage 30, the carriage 30 is moved by a driving motor 35 as a driving source. A driving force of the driving motor 35 is transferred through a timing belt 34 to the carriage 30.

That is, when the driving motor 35 is operated, the timing belt 34 is rotated so that the carriage 30 is slidably moved along a carriage shaft.

A guide rail 36 is formed at an upper portion of a main frame 37, on which an upper portion of the carriage 30 is slidably mounted. The carriage shaft 33 is formed at a lower portion of the main frame 37, on which the carriage 30 is moved along an axis thereof. Accordingly, the carriage 30 is guided by the guide rail 36 and the carriage shaft 33.

The fed document is supported by a document support 40 disposed below a movement path of the carriage 30.

While the carriage 30 is moved along the carriage shaft 33, the printhead 31 and the scanner 32 are independently operated. When a command for printing data on the recordable paper is inputted into the multi-functional apparatus, ink is injected by nozzles 31a of the printhead 31 to print the data on the recordable paper. When a command for scanning the document is inputted into the multi-functional apparatus, the scanner 32 scans the document.

The printed paper on which the data are printed by the printhead 31 and the scanned document which is scanned by the scanner 32 pass between the carriage 30 and the document support 40, and are in turn discharged by a discharger 50 which includes a paper discharging roller 51 and a star-shaped roller 52.

In a view of an inner structure of the scanner 32, the scanner 32 includes a housing 320 (FIGS. 4 and 5) having an opening at a lower portion thereof, a lamp 320a as a light source disposed in the housing 320, lenses 320b through which light passes after being emitted from the lamp 320a and reflected by the document, and a charge coupled device sensor 320c for converting the reflected light passing through the lenses 320b into a voltage to detect data.

In the multi-functional apparatus according to the conventional art, there is a disadvantage in that the scanner 32 cannot scan the document since an alien substance, such as dust or ink injected by the nozzles 31a of the printhead 31 on the carriage 30, is introduced into and pollutes the printhead 31 and the scanner 32.

To prevent the printhead 31 and the scanner 32 from being polluted, a transparent window is assembled to the opening of the scanning housing 320 so that the ink or the dust can be prevented from being introduced into the scanner housing 320.

In the multi-functional apparatus according to the conventional art as described above, however, the alien substance such as the ink or the dust is not introduced into the scanner housing 320 due to a presence of the transparent window 320d, but is smeared on a surface of the window 320d. Accordingly, when the alien substance is stacked on the window 320d, the light cannot be transmitted through the window 320d, so that the scanner 32 cannot precisely scan the document.

The alien substance such as the ink or the dust must be removed from the window 320d in order that the scanner can scan the document. The removing of the alien substance is accomplished by cleaning the window 320d with cotton or a piece of cloth.

However, there is no space in which dusting implements can be positioned between the scanner 32 and the document support 40. There is a difficulty in that, in order to clean the window 320d, the scanner 32 must be disassembled from the body of the multi-functional apparatus.

SUMMARY OF THE INVENTION

The present invention has been made to overcome the above described problem of the prior art.

It is an object of the present invention to provide a multi-functional apparatus in which an alien substance can be removed from a window of a scanner without detaching the scanner from a body thereof.

To accomplish the above object of the present invention, according to an embodiment of the present invention, there is provided a multi-functional apparatus having a main frame, a printhead for printing data on a recordable paper by injecting ink on the recordable paper using nozzles, a scanner for reading a document having data, a carriage on which the printhead and the scanner are mounted, driving means for moving the carriage reciprocally, guiding means which is mounted so as to traverse the main frame for guiding the carriage, and a window mounted below the scanner.

As an improvement, a support is disposed so as to be opposed to the window of the scanner to support the document, and to have a space for positioning a dusting implement therein to clean the window at a predetermined position of the document support, and the carriage is moved such that the window is disposed over the space in which the dusting implement positioned when a cleaning mode is selected.

According to another embodiment of the present invention, there is provided a multi-functional apparatus having a main frame, a printhead for printing data on a recordable paper by injecting ink on the recordable paper using nozzles, a scanner for reading a document having data, a carriage on which the printhead and the scanner are mounted, driving means for moving the carriage reciprocally, guiding means which is mounted so as to traverse the main frame for guiding the carriage, and a window mounted below the scanner.

As an improvement, a throughhole is formed at a position in an outer cover to which the guiding means for guiding the carriage is extended so that the carriage is moved out of the outer cover, a frame having an opening at a side thereof is projected from the outer cover near the throughhole so as to be opposed to the window of the scanner, and in which the guiding means for the carriage is disposed to be extended, and the carriage is moved such that the window is opposed to the opening of the frame when a cleaning mode is selected.

A cover for covering the frame is detachably mounted on the outer cover.

The frame cover is combined with the outer cover in a press-fit manner.

Latches are formed in the outer cover at positions spaced at a predetermined distance apart from the throughhole and additional latches are formed on the frame cover to be respectively inserted into the latches in the outer cover.

At least one of the latches in the outer cover and the latches in the frame cover have a curved shape.

BRIEF DESCRIPTION OF THE DRAWINGS

The above object and other advantages of the present invention will become more apparent by describing in detail the preferred embodiment thereof with reference to the attached drawings, in which.

DESCRIPTION OF THE PREFERRED EMBODIMENT

Hereinafter, a device for feeding a recordable paper in an ink jet printer according to an embodiment of the present invention will be described in detail with reference to the accompanying drawings.

Figure 1:
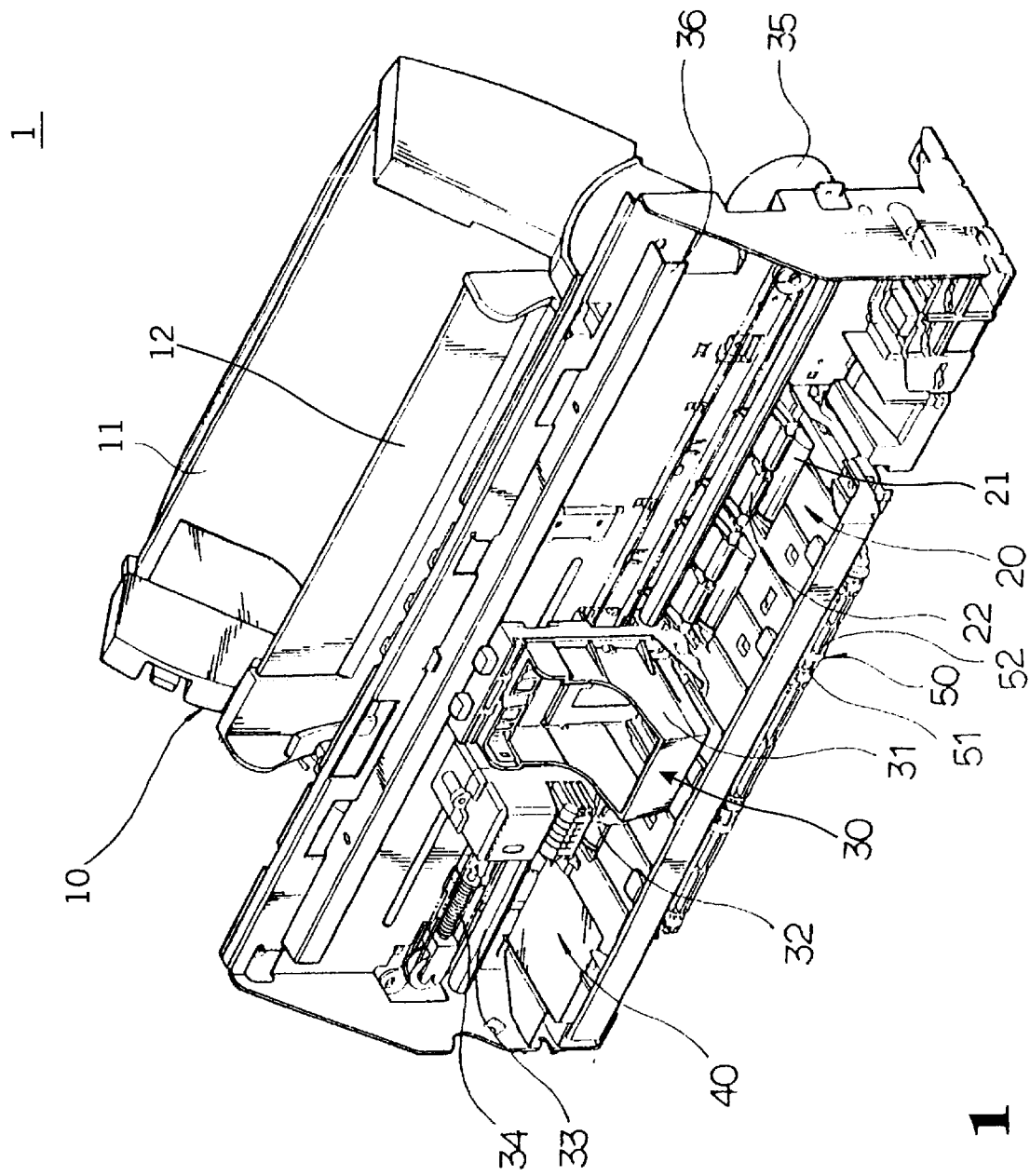
FIG. 1 is a perspective view showing an entire structure of a multi-functional apparatus according to the conventional art.
Figure 2:
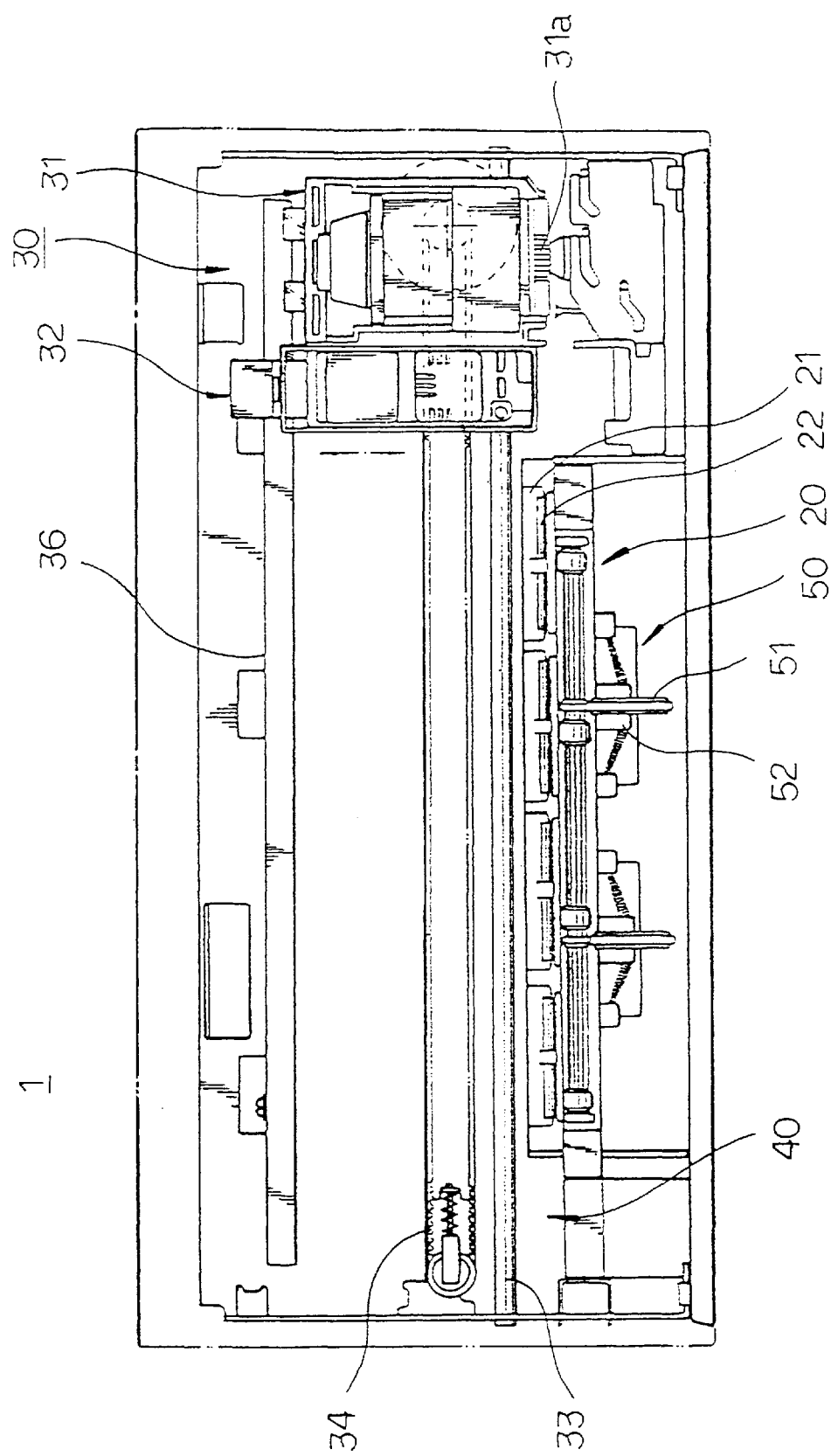
FIG. 2 is a front view of the multi-functional apparatus in FIG. 1.
Figure 3:
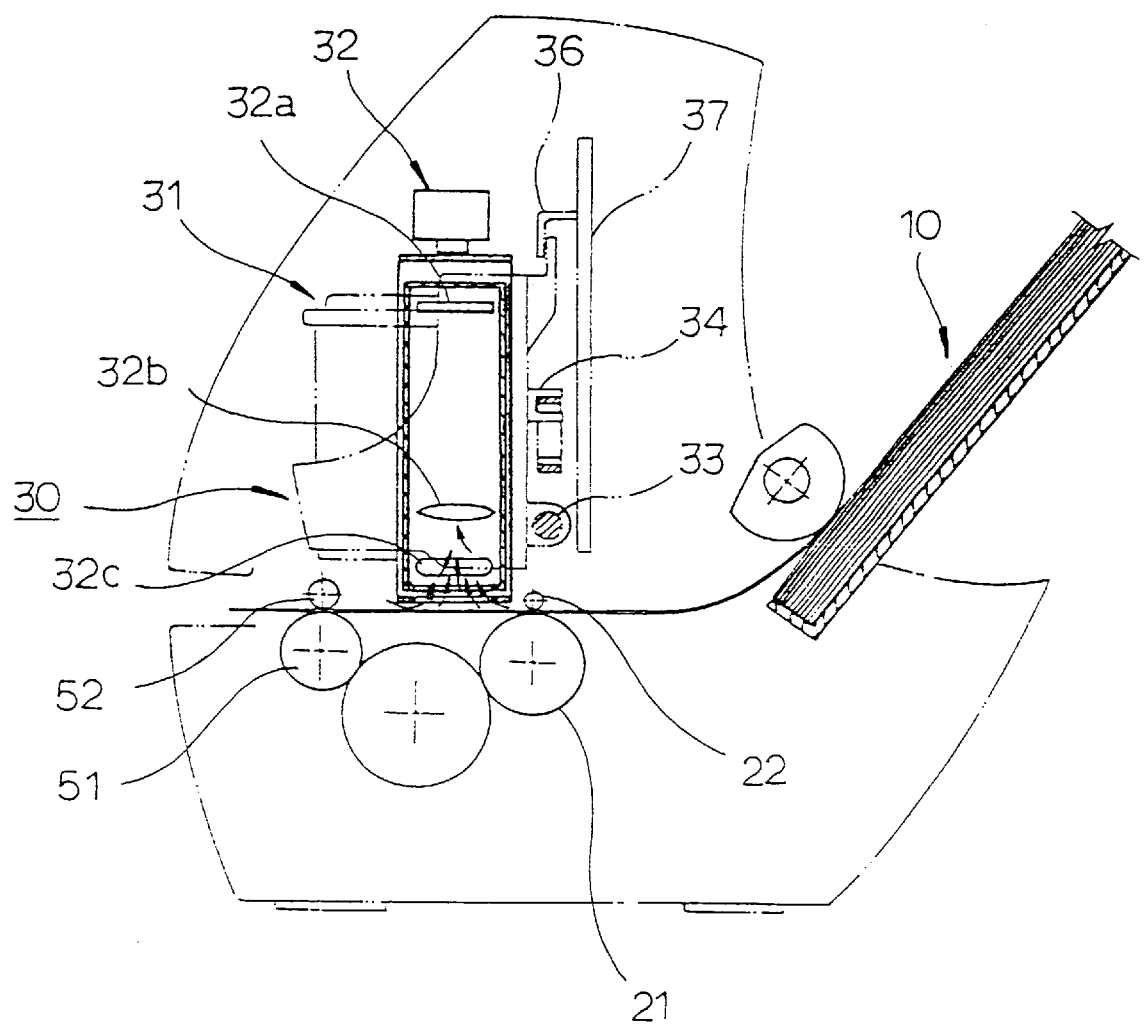
FIG. 3 is a side view of the multi-functional apparatus in FIG. 1.
Figure 6:
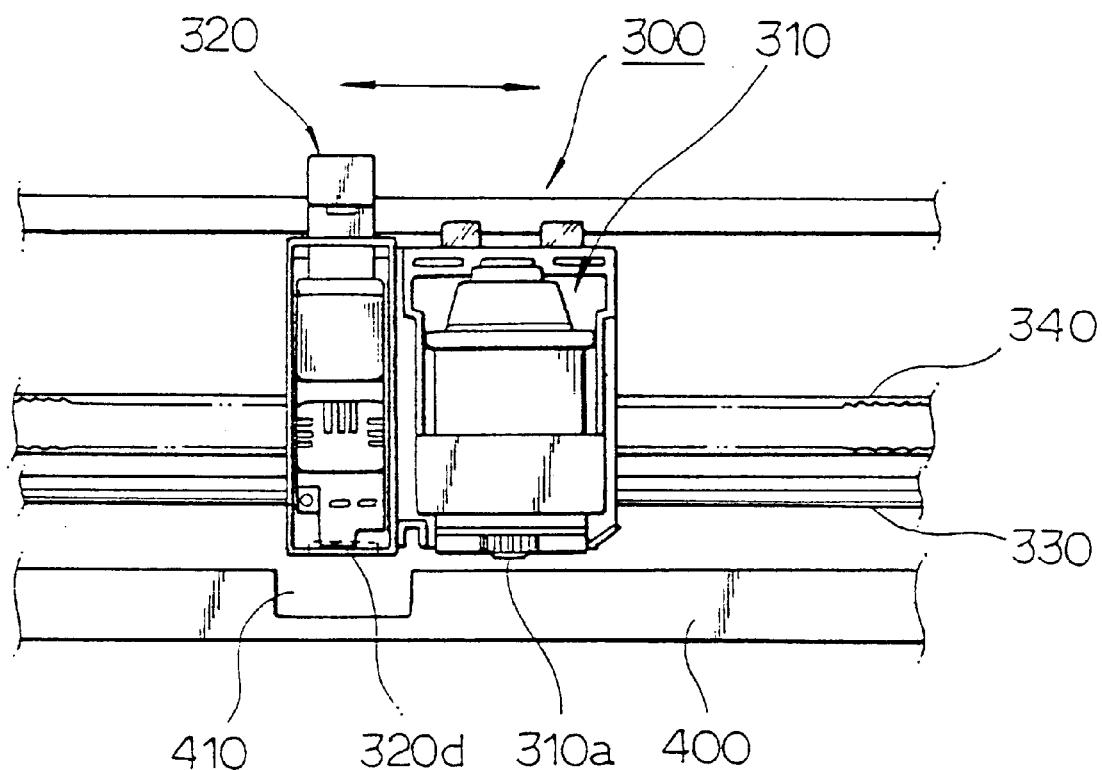
FIG. 6 is a partial view of a multi-functional apparatus according to an embodiment of the present invention, which shows a document support.

FIG. 6 is a partial view of a multi-functional apparatus according to an embodiment of the present invention, which shows a document support. Referring to FIGS. 1 and 6, the multifunctional apparatus 1 according to the present invention includes a feeder 10 for feeding recordable papers, feeder 10 being automatically or manually operated in a mode 11 for feeding a sheet of the recordable paper or a mode 12 of feeding the recordable papers automatically. A feed roller 21 and a friction roller 22 are disposed so as to be opposed to each other at a front of the feeder 10 for feeding a document introduced through a predetermined pressure into a body of the multi-functional apparatus 1 through the feeder 10. A carriage 30 is movably mounted on a main frame 37, and has a printhead 31 for printing data on the recordable paper and a scanner 32 for scanning a document. A discharger 50 for discharging the recorded paper is mounted at an outlet to discharge the document, and is comprised of a paper discharging roller 51 and a star-shaped wheel 52.

The carriage 30 is moved by a driving motor 35 as a driving source. A driving force of the driving motor 35 is transferred through a timing belt 34 to the carriage 30. That is, the driving motor 35 rotatably drives the timing belt 34. The carriage 30 is slidably and reciprocally moved by a rotation of the timing belt 34.

A guide rail 36 is assembled to an upper portion of the main frame 37 so that the carriage 30 is slidably moved along the guide shaft 36. A carriage shaft 30 is assembled to a lower portion of the main frame 37 so that the carriage 30 is reciprocally moved along the carriage shaft 30.

While the carriage 30 is moved in such a manner as described above, the printhead 31 and the scanner 32 are independently operated. That is, when a command for printing is inputted into the multi-functional apparatus, ink is injected by nozzles 31a mounted on the printhead 31 to print data on the recordable paper, resulting in accomplishing a document. When a command for scanning a document is inputted into the multi-functional apparatus, the scanner 32 is driven to read the document.

The recorded paper having data printed by the printhead 31 or the document scanned by the scanner 32 passes through a document support 40, which in turn passes through the paper discharging roller 51 and the star-shaped wheel 52 so as to be discharged.

Figure 4:
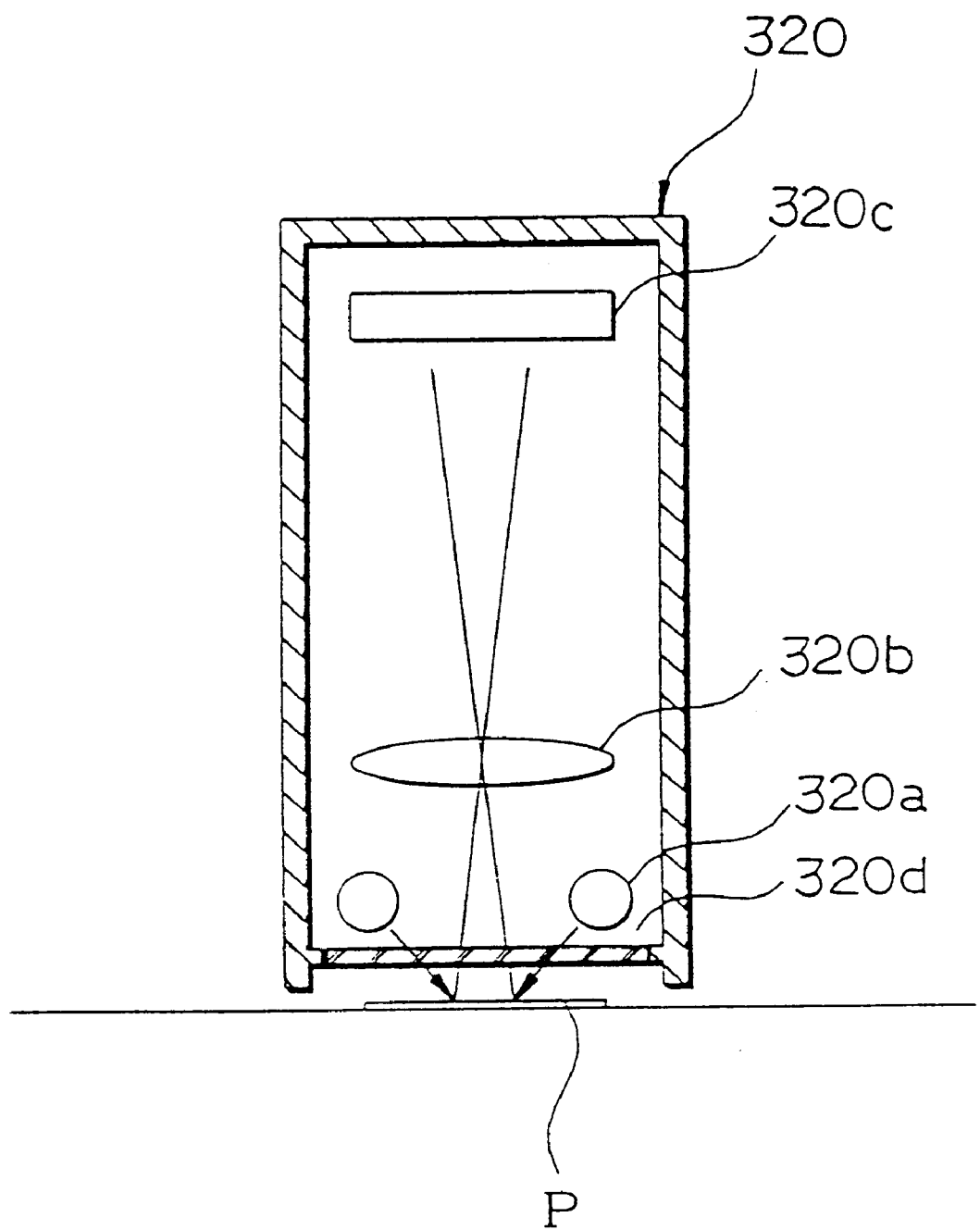
FIG. 4 is a schematic view of a scanner having a member for preventing an alien substance from being introduced therein according to the conventional art.
Figure 5:
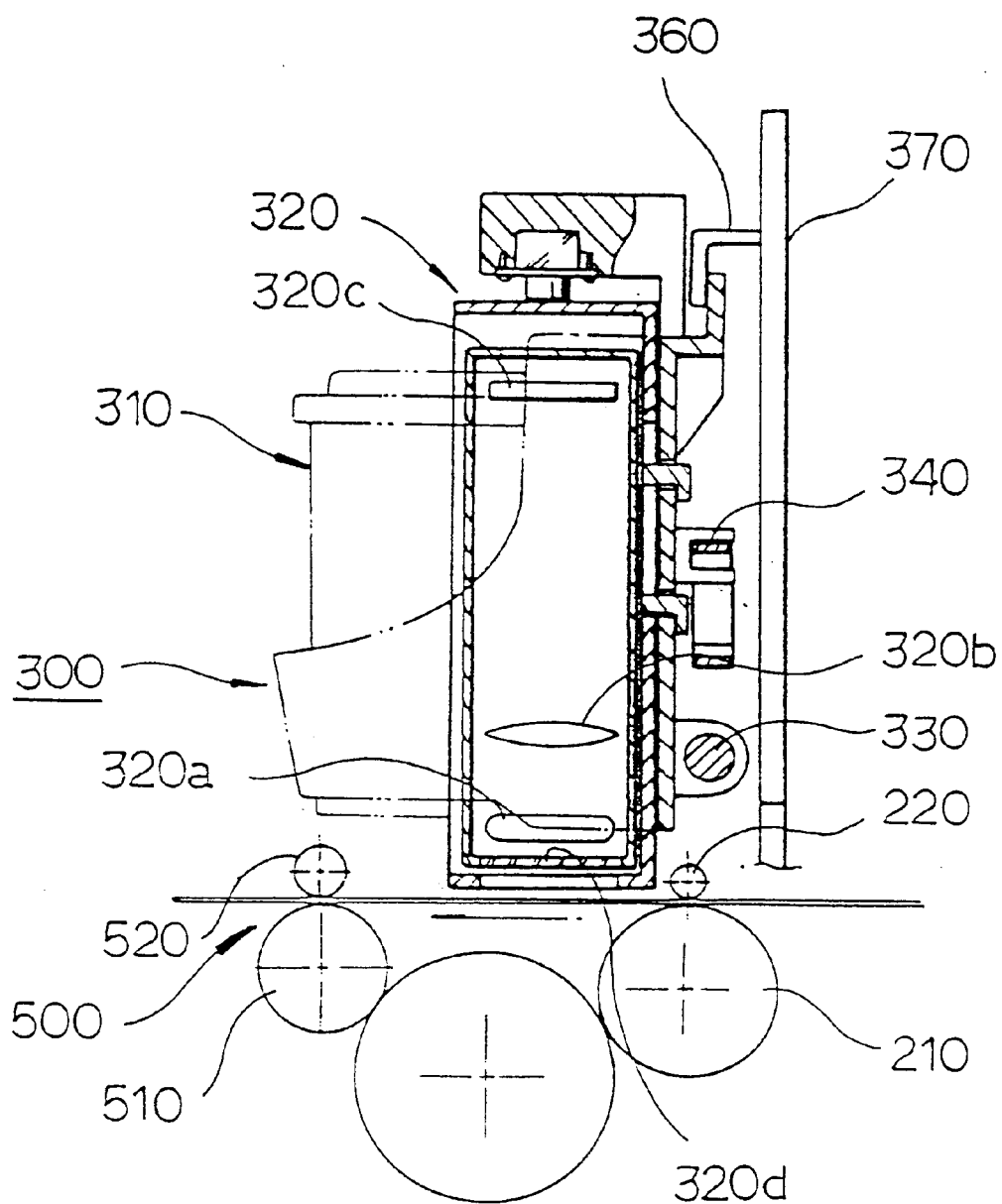
FIG. 5 is a side view of the scanner in FIG. 4.

In a view of an inner structure of the scanner 32, the scanner 32 includes a housing 320 having an opening at a lower portion, a lamp 320a as a light source which is mounted in the housing 320, lenses 320b through which light reflected by the document passes after the light is emitted from the lamp 320a, and a charge coupled device sensor 320c (hereinafter, referred to as a CCD sensor) detecting data by converting the reflected light passing through the lenses 320b into a voltage, as shown in FIGS. 4 and 5.

A transparent window 320d is provided at the opening of the scanner housing 320 so as to prevent an alien substance, such as ink injected by the nozzles 31a of the printhead 31 or dust, from being introduced into the scanner 32.

Further referring to FIG. 5, the fed roller 210, friction roller 220 and discharger 500 (including discharge roller 510 and star-shaped roller 520) correspond to the feed roller 21, friction roller 22 and discharger 50 (including discharge roller 51 and star-shaped roller 52), respectively, shown in FIG. 1 as discussed above.

As shown in FIG. 6, a recess 410 for receiving dust implements is formed at a side of the document support 400 which is opposed to the window 320d and supports the document, and the dust implement, such as a piece of cloth and cotton, is received therein. An electronic controller controls the movement of the carriage 300 such that the window 320d of the scanner 32 is disposed over the recess 410 for receiving the dust things.

The recess 410 for receiving the dust implement is preferably formed on a side of the document support 400 so as not to interrupt the movement of the document.

Hereinafter, an operation of the multi-functional apparatus according to the present invention will be described in detail.

Referring to FIGS. 1 and 6, the printhead 310 for printing data on the recordable paper and the scanner 320 for scanning the document are mounted on the carriage 300 which is moved by the driving motor 35 as the driving source. The driving force of the driving motor 35 rotates the timing belt 340. The carriage 300 is slidably moved along the carriage shaft 330 by the rotation of the timing belt 340.

On the other hand, the alien substance such as the dust and the ink injected by the nozzles 310a of the printhead 310 is prevented by the window 320d from being introduced into the scanner housing 320 and smeared on a surface of the window 320d when a printing is performed.

When the window 320d is smeared with the alien substance, the window 320d must be manually cleaned. The cleaning of the window 320d will be described.

When the cleaning mode is selected after stopping the operation of the multi-functional apparatus, the electronic controller controls the carriage 300 so that the window 320d of the scanner 320 is disposed over the upper portion of the recess 410 for receiving the dust implement.

Then, cotton or a piece of cloth is inserted in the recess 410 to clean the surface of the window 320d and to remove the alien substance from the surface of the window 320d.

Figure 7:
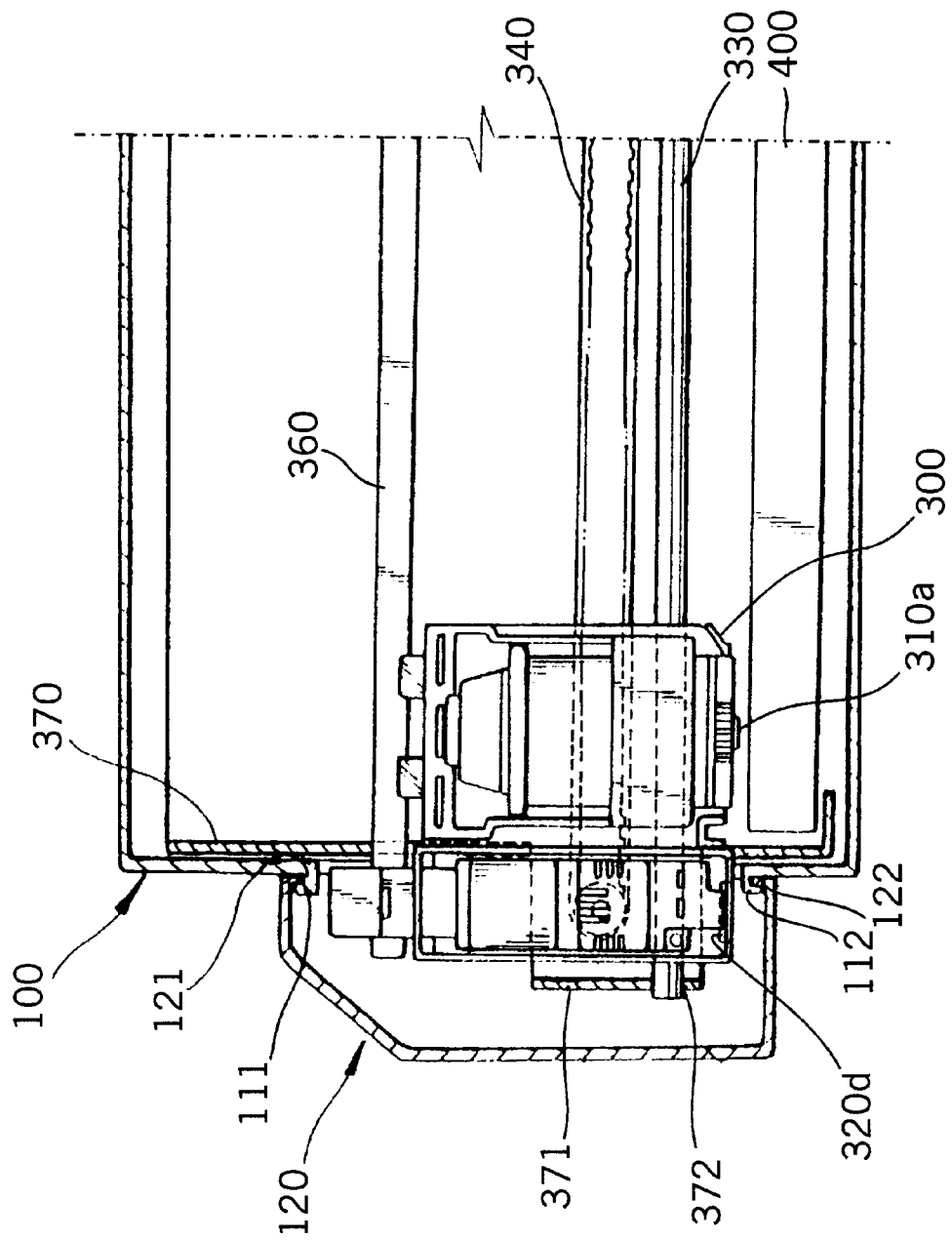
FIG. 7 is a partial view of a multi-functional apparatus according to another embodiment of the present invention.
Figure 8:
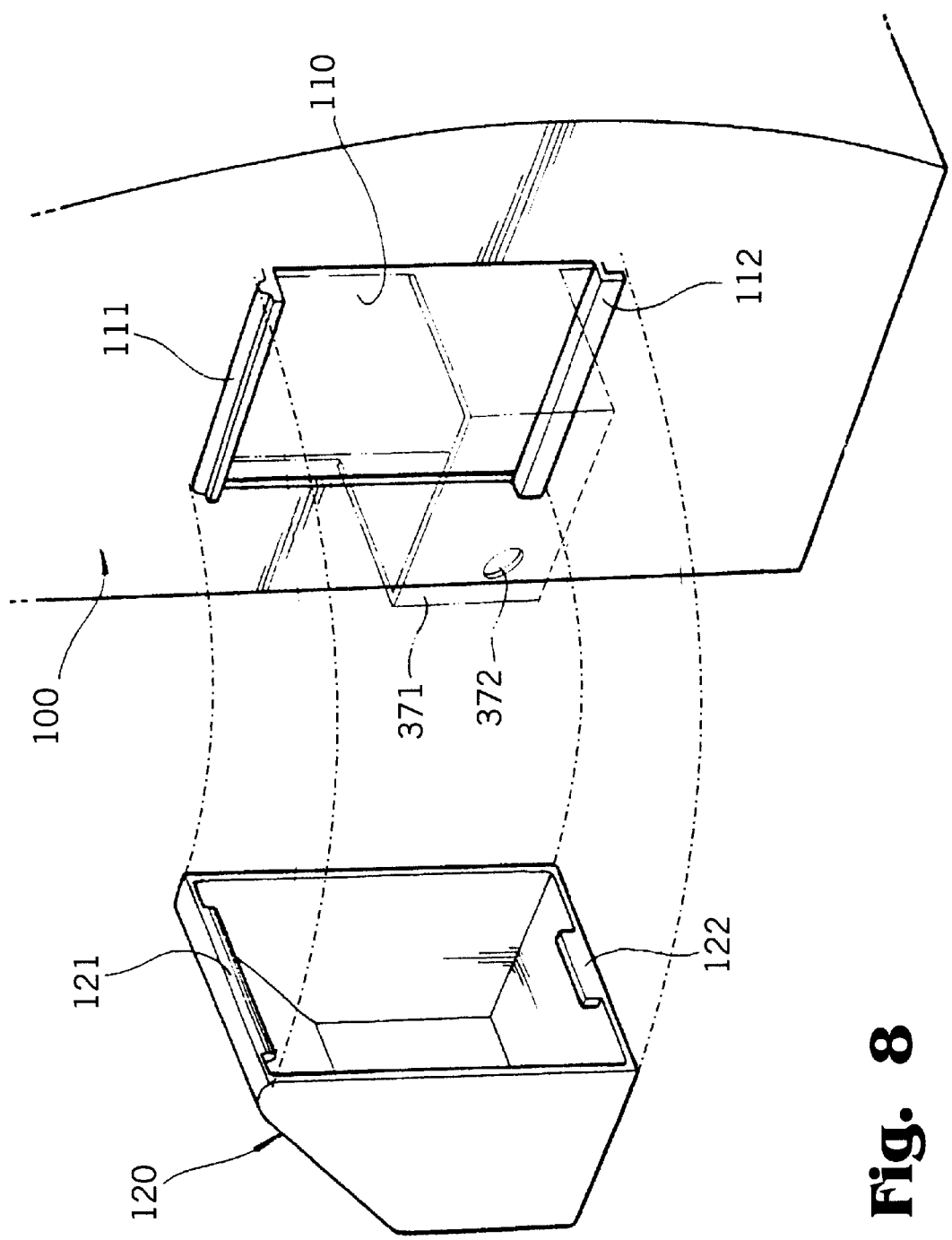
FIG. 8 is a perspective view of a cover of the multi-functional apparatus according to the to other embodiment of the present invention, which shows the cover detached from a body of the multi-functional apparatus.
Figure 9:
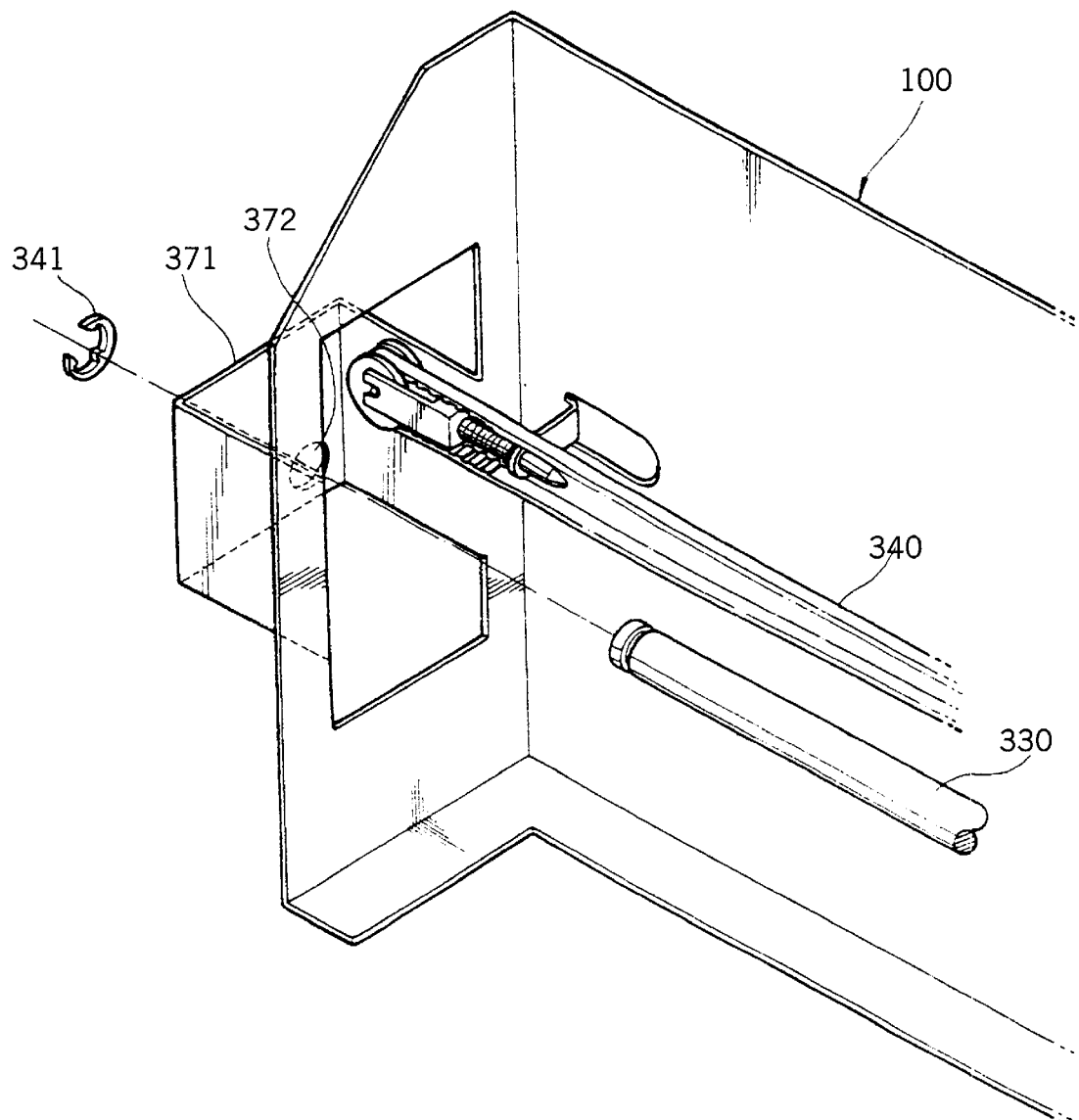
FIG. 9 is a partially sectional view of the multi-functional apparatus according to the other embodiment of the present invention, which shows an outer cover.

FIGS. 7 to 9 are views of the multi-functional apparatus having the window for the scanner according to another embodiment of the present invention, and show the cleaning of the window for the scanner. Referring to FIGS. 1 and 7–9, the multi-functional apparatus has an outer cover 100 detachably mounted on the body thereof. A throughhole 110 is formed in a side wall of the outer cover 100 corresponding to an extension of the carriage shaft so that the carriage 300 is moved therein. A frame 371 having an opening or hole 372 is formed at a position adjacent to the throughhole 110. The timing belt 340 is assembled to a back wall 371a of the frame 371 so as to extend outward. The carriage shaft 330 is assembled to a side wall 371b so as to be moved from the outer cover 100 to the projected frame 371. The electronic controller controls the driving motor 35 so that the carriage 300 is moved so as to be positioned in the frame 371.

The cover 120 is detachably mounted on the outer cover 100 to cover the frame 371. For example, latches 111 and 112 are respectively formed at upper and lower portions of the throughhole 110 of the outer cover 100, and projections 121 and 122 are respectively formed at upper and lower portions of the frame cover 120 so as to be engaged with the latches 111 and 112.

The lower latch 112 of the outer cover 100 has a ⌈ shape and the lower projection 122 of the frame cover 120 has a ⌋ shape.

The upper latch 111 of the outer cover 100 and the upper projection 121 of the frame cover 120 have a semi-spherical shape so as to be engaged with each other by a resilient force thereof.

Hole 372 is formed at the side wall of the frame 371, through which an end of the carriage shaft 330 extends. An E-shaped ring 341 is mounted on the end of the carriage shaft 330 to prevent the carriage shaft 330 from being separated from the side wall of the frame 371.

The cleaning of the scanner 32 having a structure as described above will be described. When the window 320d is polluted with an alien substance such as dust or ink injected from the nozzles 31a of the printhead, the operation of the multi-functional apparatus is stopped and the cleaning mode is selected.

The electronic controller controls the driving motor 35 to be driven when the cleaning mode is selected. The electronic controller controls in such a way that the carriage 300 is positioned in the frame 371 projecting from the outer cover 100.

The timing belt 340 is rotated by the rotation force of the driving motor 35 and the carriage 300 is moved by the rotation force of the timing belt 340 along the carriage shaft 330 so as to be positioned in the frame 371.

Then, when the upper portion of the frame cover 120 is pulled upward, the projection 121 of the frame cover 120 having the spherical shape is separated from the latch 111. Then, the projection 122 of the frame cover 120 is separated from the latch 112 when the lower portion of the frame cover 120 is pulled downward. Thus, the frame cover 120 is disassembled from the outer cover 100.

The window 320d of the scanner 32 is exposed through the opening of the frame 371 to the atmosphere when the frame cover 120 is disassembled from the outer cover 100. An operator cleans the alien substance, such as the ink on the window 320d, by using cotton or a piece of cloth.

When the removal of the alien substance on the window 320d is completed, the frame cover 120 is assembled to the outer cover 100. At this time, the lower projection 122 of the frame cover 120 is positioned so as to be engaged with the lower latch 112, and then the frame cover 120 is rotated so as to be positioned at a front of the latch 111. Continuously, when the upper portion of the frame cover 120 is pushed to the outer cover 100, the projection 121 of the frame cover 120 having the semi-spherical shape is engaged with the latch 111. Thereby, the frame cover 120 is assembled to the outer cover 100.

In the multi-functional apparatus according to the conventional art, in order to remove the alien substance from the window 320d of the scanner 32, the scanner 32 must be disassembled from the body of the multi-functional apparatus and then the alien substance is removed from the window 320d. Finally, the scanner 32 is assembled to the multi-functional apparatus again. In the multi-functional apparatus according to the present invention, however, the alien substance can be removed from the window 320d without disassembling the scanner 32 from the body of the multi-functional apparatus because there is a space for cleaning the window 320*d*.

As described above, according to the present invention, since the cleaning of the window 320*d* is performed without disassembling the scanner from the multi-functional apparatus, there is an advantage in that it is easy to clean the window.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. In a multi-functional apparatus having a main frame, a printhead for printing data on a recordable paper by injecting ink on the recordable paper using nozzles, a scanner for reading a document having data, a carriage on which the printhead and the scanner are disposed, driving means for moving the carriage reciprocally, guiding means mounted so as to traverse the main frame for guiding the carriage, and a window mounted below the scanner;

the improvement wherein said apparatus further comprises a support disposed in opposition to the window of the scanner to support the document, said support having a recess formed therein for positioning a dusting implement therein to clean the window at a predetermined position of the document support, and wherein the carriage is moved such that the window is disposed over the recess in which the dusting implement is positioned when a cleaning mode is selected.

2. In a multi-functional apparatus having a main frame, a printhead for printing data on a recordable paper by injecting ink on the recordable paper using nozzles, a scanner for reading a document having data, a carriage on which the printhead and the scanner are disposed, driving means for moving the carriage reciprocally, guiding means mounted so as to traverse the main frame for guiding the carriage, and a window mounted below the scanner;

the improvement wherein the apparatus comprises an outer cover and a throughhole is formed at a position in the outer cover, said guiding means extending into said throughhole so that the carriage is movable to a position outside the outer cover, and said apparatus further comprises a frame having an opening at a side thereof and extending outward from the outer cover near the throughhole so as to be disposed opposite to the window, and wherein the carriage is movable to a clearing position such that the window is disposed opposite to the opening of the frame when a cleaning mode is selected.

3. The improvement as claimed in claim 2, wherein said apparatus further comprises a frame cover detachably mounted on the outer cover for covering the frame when mounted on the outer cover.

4. The improvement as claimed in claim 3, wherein the frame cover is mounted on the outer cover in a press-fit manner.

5. The improvement as claimed in claim 4, wherein latches are formed in the outer cover at positions adjacent to the throughhole, and additional latches are formed on the frame cover for insertion into the latches of the outer cover.

6. The improvement as claimed in claim 5, wherein at least one of the latches formed in the outer cover and the additional latches of the frame cover have a curved shape.

7. In a multi-functional apparatus having a main frame, an outer cover joined to the main frame, a printhead for printing data on a recordable paper by injecting ink on the recordable paper using nozzles, a scanner for reading a document having data, a carriage on which the printhead and the scanner are disposed, driving means for moving the carriage reciprocally, guiding means mounted so as to traverse the main frame for guiding the carriage, and a window mounted below the scanner;

the improvement wherein said apparatus further comprises a dusting implement receiving section for receiving a dusting implement to clean the window of the scanner, and the driving means is controlled so that the carriage is positioned by the driving means at a position near the dusting implement receiving section when a cleaning mode is selected.

8. The improvement as claimed in claim 7, wherein said apparatus further comprises a document support for supporting a document to be scanned and the dusting implement receiving section comprises a recess formed at a predetermined position on said document support.

9. The improvement as claimed in claim 7, wherein the dusting implement receiving section further comprises a frame having an opening formed at a side thereof opposite to the window of the scanner, the frame being protrusively formed on the outer cover and positioned on an extension of the guiding means.

10. The improvement as claimed in claim 9, wherein said apparatus further comprises a frame cover for covering the frame detachably mounted on the outer cover.

11. The improvement as claimed in claim 10, wherein the frame cover is joined with the outer cover in a press-fit manner.

12. The improvement as claimed in claim 11, wherein latches are formed in the outer cover at positions adjacent to the throughhole, and additional latches are formed on the frame cover for insertion into the latches formed in the outer cover.

13. The improvement as claimed in claim 12, wherein at least one of the latches formed in the outer cover and the additional latches of the frame cover have a curved shape.

* * * * *